(12) United States Patent
Welle (10) Patent No.: US 8,240,336 B2
(45) Date of Patent: Aug. 14, 2012

(54) PHASE-CHANGE VALVE APPARATUSES

(75) Inventor: Richard P. Welle, Huntington Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 199 days.

(21) Appl. No.: 12/759,493

(22) Filed: Apr. 13, 2010

(65) Prior Publication Data

US 2010/0200093 A1  Aug. 12, 2010

Related U.S. Application Data

(62) Division of application No. 10/843,515, filed on May 10, 2004, now Pat. No. 7,694,694.

(51) Int. Cl.
*F15C 1/04* (2006.01)

(52) U.S. Cl. .......................................... 137/828; 137/831

(58) Field of Classification Search .................. 137/827, 137/828, 825, 829, 831; 251/11, 62, 89
See application file for complete search history.

(56) References Cited

U.S. PATENT DOCUMENTS

| | | | |
|---|---|---|---|
| 2,910,836 A | 11/1959 | Karrer | |
| 2,928,253 A | 3/1960 | Lopp et al. | |
| 3,111,813 A | 11/1963 | Blumentritt | |
| 3,197,342 A | 7/1965 | Neild, Jr. | |
| 3,212,272 A | 10/1965 | Sommers | |
| 3,397,860 A | 8/1968 | Bushmeyer | |
| 3,779,814 A | 12/1973 | Miles et al. | |
| 4,476,685 A | 10/1984 | Aid | |
| 4,920,264 A | 4/1990 | Becker | |
| 4,938,258 A | 7/1990 | Sato | |
| 4,989,626 A | 2/1991 | Takagi et al. | |
| 5,101,848 A | 4/1992 | Kojima et al. | |
| 5,249,929 A | 10/1993 | Miller, Jr. et al. | |
| 5,603,351 A | 2/1997 | Cherukuri et al. | |
| 5,662,143 A | 9/1997 | Caughran | |
| 5,699,157 A | 12/1997 | Parce | |
| 5,795,788 A | 8/1998 | Bevan et al. | |
| 5,849,208 A | 12/1998 | Hayes et al. | |
| 5,975,856 A | 11/1999 | Welle | |
| 5,988,197 A | 11/1999 | Colin et al. | |
| 5,993,634 A | 11/1999 | Simpson et al. | |
| 6,007,302 A | 12/1999 | Welle | |
| 6,086,740 A | 7/2000 | Kennedy | |
| 6,100,463 A | 8/2000 | Ladd et al. | |
| 6,120,985 A | 9/2000 | Laugham et al. | |
| 6,149,123 A | 11/2000 | Harris et al. | |
| 6,159,744 A | 12/2000 | Bevan et al. | |

(Continued)

OTHER PUBLICATIONS

Ozaki, "Pumping mechanism using periodic phase changes of a fluid," Micro Electro Mechanical Systems, 1995, MEMS '95, Proceedings, IEEE, 31-36 (Jan. 29-Feb. 2, 1995).

(Continued)

*Primary Examiner* — Craig Schneider
(74) *Attorney, Agent, or Firm* — Jones Day; Nicola A. Pisano; Jaime D. Choi (57) ABSTRACT

A valve apparatus includes a substrate, a main flow channel formed in the substrate, a control channel formed in the substrate such that the main flow channel and the control channel meet at a junction, a bi-phase material within the control channel, a heating element adjacent the control channel and the junction, the heating element being controllable to generate sufficient energy to cause the bi-phase material to transition from a solid phase to a liquid phase, and a pumping mechanism for forcing the bi-phase material either into or out of the junction when the bi-phase material is in the liquid phase.

7 Claims, 10 Drawing Sheets

U.S. PATENT DOCUMENTS

| | | | |
|---|---|---|---|
| 6,282,907 B1 | 9/2001 | Ghoshal |
| 6,283,718 B1 | 9/2001 | Prosperetti et al. |
| 6,311,713 B1 | 11/2001 | Kaartinen |
| 6,328,070 B2 | 12/2001 | Clayton et al. |
| 6,344,325 B1 | 2/2002 | Quake et al. |
| 6,349,740 B1 | 2/2002 | Cho et al. |
| 6,382,254 B1 | 5/2002 | Yang et al. |
| 6,387,234 B1 | 5/2002 | Yeung et al. |
| 6,408,878 B2 | 6/2002 | Unger et al. |
| 6,453,928 B1 | 9/2002 | Kaplan et al. |
| 6,467,275 B1 | 10/2002 | Ghoshal |
| 6,521,188 B1 | 2/2003 | Webster |
| 6,536,476 B2 | 3/2003 | Ueno et al. |
| 6,540,895 B1 | 4/2003 | Spence et al. |
| 6,557,575 B1 | 5/2003 | Gerhardt et al. |
| 6,561,479 B1 | 5/2003 | Eldridge |
| 6,575,188 B2 | 6/2003 | Parunak |
| 6,598,403 B1 | 7/2003 | Ghoshal |
| 6,599,098 B2 | 7/2003 | Weng et al. |
| 6,619,311 B2 | 9/2003 | O'Connor et al. |
| 6,637,210 B2 | 10/2003 | Bell |
| 6,658,860 B2 | 12/2003 | McGrew |
| 6,679,279 B1 | 1/2004 | Liu et al. |
| 6,767,706 B2 | 7/2004 | Quake et al. |
| 6,793,753 B2 | 9/2004 | Unger et al. |
| 6,857,449 B1 | 2/2005 | Chow |
| 6,877,528 B2 | 4/2005 | Gilbert et al. |
| 6,880,576 B2 | 4/2005 | Karp et al. |
| 6,959,555 B2 | 11/2005 | Bell |
| 6,981,522 B2 | 1/2006 | O'Connor et al. |
| 7,008,193 B2 | 3/2006 | Najafi et al. |
| 7,128,081 B2 | 10/2006 | Dourdeville |
| 7,195,036 B2 | 3/2007 | Burns et al. |
| 7,216,660 B2 | 5/2007 | Troian et al. |
| 7,241,421 B2 | 7/2007 | Webster et al. |
| 7,650,910 B2 | 1/2010 | Welle |
| 7,686,040 B2 | 3/2010 | Welle |
| 7,721,762 B2 | 5/2010 | Welle |
| 7,757,716 B2 | 7/2010 | Welle |
| 7,757,717 B2 | 7/2010 | Welle |
| 2002/0007858 A1 | 1/2002 | Xu et al. |
| 2002/0029814 A1 | 3/2002 | Unger et al. |
| 2002/0124879 A1 | 9/2002 | Kaplan et al. |
| 2002/0127736 A1 | 9/2002 | Chou et al. |
| 2002/0143437 A1 | 10/2002 | Handique et al. |
| 2002/0144738 A1 | 10/2002 | Unger et al. |
| 2002/0145231 A1 | 10/2002 | Quake et al. |
| 2002/0148234 A1 | 10/2002 | Bell |
| 2002/0150683 A1 | 10/2002 | Troian |
| 2002/0166585 A1 | 11/2002 | O'Connor et al. |
| 2003/0008308 A1 | 1/2003 | Enzelberger et al. |
| 2003/0019522 A1 | 1/2003 | Parunak |
| 2003/0019833 A1 | 1/2003 | Unger et al. |
| 2003/0061687 A1 | 4/2003 | Hansen et al. |
| 2003/0080442 A1 | 5/2003 | Unger |
| 2003/0089865 A1 | 5/2003 | Eldridge |
| 2003/0096310 A1 | 5/2003 | Hansen et al. |
| 2003/0106799 A1 | 6/2003 | Covington et al. |
| 2003/0152463 A1 | 8/2003 | Shuler et al. |
| 2003/0231967 A1 | 12/2003 | Najafi et al. |
| 2004/0073175 A1 | 4/2004 | Jacobson et al. |
| 2004/0084647 A1 | 5/2004 | Beden et al. |
| 2004/0086871 A1 | 5/2004 | Schembri |
| 2004/0115731 A1 | 6/2004 | Hansen et al. |
| 2004/0179975 A1 | 9/2004 | Cox et al. |
| 2004/0219732 A1 | 11/2004 | Burns et al. |
| 2004/0248167 A1 | 12/2004 | Quake et al. |
| 2005/0086830 A1 | 4/2005 | Zukor et al. |
| 2005/0247356 A1 | 11/2005 | Welle |
| 2005/0247357 A1 | 11/2005 | Welle |
| 2005/0247358 A1 | 11/2005 | Welle |
| 2005/0249607 A1 | 11/2005 | Klee |
| 2005/0260081 A1 | 11/2005 | Tanaka et al. |
| 2005/0284511 A1 | 12/2005 | Welle |
| 2005/0284526 A1 | 12/2005 | Welle |
| 2005/0284527 A1 | 12/2005 | Welle |
| 2007/0227592 A1 | 10/2007 | Allen et al. |
| 2008/0230490 A1 | 9/2008 | Welle |
| 2010/0229986 A1 | 9/2010 | Welle |

OTHER PUBLICATIONS

Sim et al., "A phase change type micropump with aluminum flap valves," J. Micromech. Microeng., 13 (2003) 286-294 (Published Jan. 29, 2003).

USPTO Notice of Allowance for U.S. Appl. No. 10/877,602, 4 pages (mailed Mar. 24, 2010).

USPTO Final Office Action for U.S. Appl. No. 10/877,602, 9 pages (mailed Nov. 2, 2009).

USPTO Non-Final Office Action for U.S. Appl. No. 10/877,602, 9 pages (mailed Feb. 2, 2009).

USPTO Non-Final Office Action for U.S. Appl. No. 10/877,602, 8 pages (mailed Jun. 12, 2008).

USPTO Non-Final Office Action for U.S. Appl. No. 10/877,602, 8 pages (mailed May 29, 2007).

USPTO Notice of Allowance for U.S. Appl. No. 10/877,691, 6 pages (mailed Mar. 10, 2010).

USPTO Non-Final Office Action for U.S. Appl. No. 10/877,691, 13 pages (mailed Aug. 17, 2009).

USPTO Final Office Action for U.S. Appl. No. 10/877,691, 11 pages (mailed Feb. 26, 2009).

USPTO Non-Final Office Action for U.S. Appl. No. 10/877,691, 6 pages (mailed Sep. 15, 2008).

USPTO Non-Final Office Action for U.S. Appl. No. 10/877,691, 6 pages (mailed Mar. 13, 2008).

USPTO Supplemental Notice of Allowance for U.S. Appl. No. 11/150,551, 4 pages (mailed Oct. 26, 2009).

USPTO Notice of Allowance for U.S. Appl. No. 11/150,551, 9 pages (mailed Sep. 11, 2009).

USPTO Non-Final Office Action for U.S. Appl. No. 11/150,551, 8 pages (mailed Feb. 2, 2009).

USPTO Non-Final Office Action for U.S. Appl. No. 11/150,551, 6 pages (mailed May 14, 2008).

USPTO Notice of Allowance for U.S. Appl. No. 10/843,515, 6 pages (mailed Nov. 30, 2009).

USPTO Non-Final Office Action for U.S. Appl. No. 10/843,515, 7 pages (mailed Jun. 23, 2009).

USPTO Non-Final Office Action for U.S. Appl. No. 10/843,515, 7 pages (mailed Nov. 17, 2008).

USPTO Advisory Action for U.S. Appl. No. 10/843,515, 3 pages (mailed Jul. 14, 2008).

USPTO Final Office Action for U.S. Appl. No. 10/843,515, 8 pages (mailed Apr. 17, 2008).

USPTO Non-Final Office Action for U.S. Appl. No. 10/843,515, 6 pages (mailed Sep. 17, 2007).

USPTO Non-Final Office Action for U.S. Appl. No. 10/843,515, 5 pages (mailed Jan. 12, 2007).

USPTO Notice of Allowance for U.S. Appl. No. 11/150,558, 11 pages (mailed Nov. 19, 2009).

USPTO Non-Final Office Action for U.S. Appl. No. 11/150,558, 10 pages (mailed Mar. 19, 2009).

USPTO Advisory Action for U.S. Appl. No. 11/150,558, 3 pages (mailed Dec. 3, 2008).

USPTO Final Office Action for U.S. Appl. No. 11/150,558, 11 pages (mailed Aug. 15, 2008).

USPTO Non-Final Office Action for U.S. Appl. No. 11/150,558, 8 pages (mailed Feb. 22, 2008).

USPTO Notice of Allowance for U.S. Appl. No. 11/190,312, 6 pages (mailed Jan. 11, 2010).

USPTO Non-Final Office Action for U.S. Appl. No. 11/190,312, 14 pages (mailed Aug. 19, 2009).

USPTO Final Office Action for U.S. Appl. No. 12/749,350, 12 pages (mailed Apr. 4, 2011).

USPTO Non-Final Office Action for U.S. Appl. No. 12/749,350, 12 pages (mailed Sep. 23. 2010).

USPTO Final Office Action for U.S. Appl. No. 11/690,115, 9 pages (mailed Sep. 2, 2010).

USPTO Non-Final Office Action for U.S. Appl. No. 11/690,115, 9 pages (mailed Mar. 26, 2010).

- ▢ SUBSTRATE
- ▦ WARM HEATER/ COOLING ELEMENT
- ▨ COLD HEATER/ COOLING ELEMENT
- ▨ LIQUID BI-PHASE MATERIAL
- ▨ SOLID BI-PHASE MATERIAL

PHASE-CHANGE VALVE APPARATUSES

CROSS-REFERENCE TO RELATED APPLICATIONS

This application is a divisional of U.S. patent application Ser. No. 10/843,515, filed May 10, 2004 now U.S. Pat. No. 7,694,694 and entitled "Phase Change Valve Apparatuses," the entire contents of which are incorporated by reference herein.

TECHNICAL FIELD

The invention relates generally to valves for controlling fluid flow and, in particular, to valves for microfluidic devices.

BACKGROUND ART

Developments in miniaturization and large-scale integration in fluidics have led to the concept of creating an entire chemistry or biology laboratory on a fluidic analog of the electronic microchip. Such integrated microfluidic devices (known as Micro Total Analysis Systems, or µTAS) are seen as key to automating and reducing costs in many biological analysis applications, including genetic analyses and medical diagnostics. Devices for these applications have been fabricated by etching small glass plates or silicon chips or by injection molding or by hot embossing of either hard or soft polymeric materials. Producing reliable valves has proven to be problematic with all of these devices.

Traditional fluid valves operate by moving solid objects to obstruct the flow path. This requires sealing against a valve seat, and often leads to complicated geometries. In etched solid chips, the valves tend to be very complicated, requiring multiple etching and deposition steps, and such valves suffer from a tendency to leak. Valves are easier to make in soft materials but, typically, they have been actuated only by pneumatic pressure. While this method has been shown to work for some applications, there are issues with the large number of pneumatic control lines required for large-scale integrated µTAS devices, as well as with concerns about leakage and the limitations on operating pressure. In addition, this is a normally open valve and can be kept closed only with the continuous application of external pneumatic pressure.

An alternative to moving a solid object to obstruct the flow is to use a phase-change material. A warm liquid is injected into a flow channel where it cools and solidifies, blocking the channel. The channel is reopened by heating and melting the phase-change material. A challenge with this type of valve is providing a source and a sink for the phase-change material. The methods proposed to date include injecting the phase change material from a side channel to close a channel, and letting it collect in a trap downstream of the valve after it is melted to open the channel. A problem with this method is that the phase-change material is used only once before being discarded making it difficult to fabricate multiple-use valves. Another problem is that it is difficult to ensure that all the phase-change material is trapped downstream of the valve, leading to the possibility that solid particles of phase-change material will flow through the rest of the microfluidic device contaminating samples or blocking flow channels.

A valve that avoids some of these problems is the Peltier-actuated valve, in which a phase change is induced in the working fluid itself. This valve is actuated by running an electric current through a Peltier junction adjacent to the fluid flow path. The Peltier junction cools the fluid sufficiently to freeze it. The valve is opened by reversing the current in the Peltier junction to heat the fluid. In a valve operating on this principle there is no contamination problem because the plug is formed from the very fluid the valve is meant to block. When the valve is opened the working fluid is restored to its original liquid state. However, as with the pneumatic valve, this valve also suffers from the drawback of being normally open; power is required to maintain the valve in a closed position. The Peltier-actuated valve is therefore not useful for applications where a flow channel needs to remain closed for extended periods, or in a power-off condition.

Thus, there remains a need for a bi-stable phase-change valve that can remain in either the open or closed position, and in which there is a very low probability of the phase-change material being lost from the valve.

DISCLOSURE OF INVENTION

Figure 1:
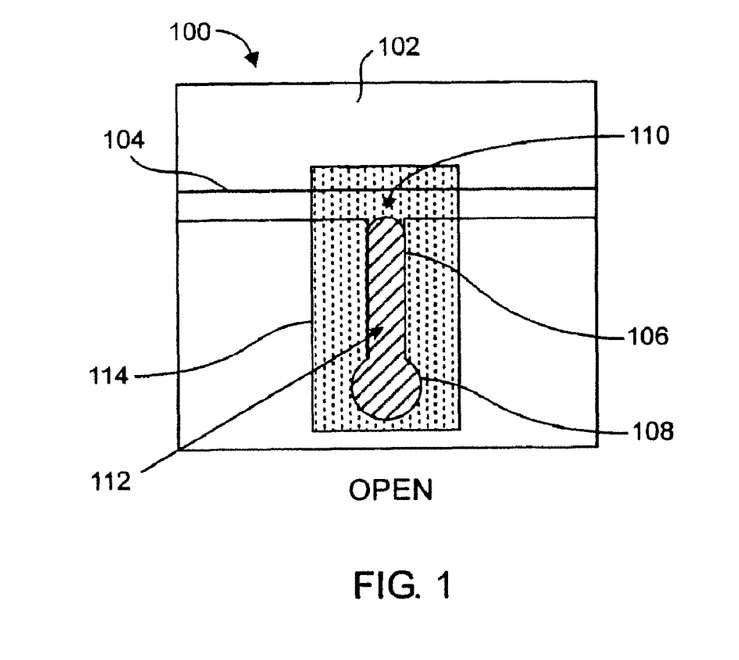
FIGS. 1 and 2 show an example embodiment of a valve apparatus in its open and closed configurations, respectively.

According to various embodiments of the present invention, an electrically actuated bi-stable valve (e.g., microvalve) uses a phase-change control fluid to alternately block and unblock the flow of a working fluid through the valve. The control fluid is introduced from a side channel, and is pumped into or out of a main flow channel when the control fluid is in a liquid state. Referring to FIG. 1, in an example embodiment, a valve apparatus 100 (shown in its open state) includes a substrate 102 in which are formed a main flow channel 104, a control channel 106 and a reservoir 108 as shown. In this example embodiment, the main flow channel 104 traverses the valve apparatus 100 in a straight, horizontal path, and the control channel 106 provides a path from a junction 110

(between the main flow channel 104 and the control channel 106) to the reservoir 108. In this example, the valve apparatus 100 includes a bi-phase material 112, which is substantially or completely contained within the reservoir 108 and the control channel 106 when the valve apparatus 100 is in its open state. The bi-phase material 112 is a substance that melts at a temperature above the normal ambient temperature of the valve apparatus 100. In this example embodiment, the valve apparatus 100 includes a heater 114 positioned such that it can heat the entire reservoir 108, as well as the control channel 106 and a portion of the main flow channel 104 to a temperature above the melting point of the bi-phase material 112. By way of example, the heater 114 can be a simple resistance heater, in which case the heat dissipates by conduction to the environment after the heater 114 is turned off, allowing the bi-phase material 112 to re-solidify. Alternatively, the heater 114 can be a Peltier junction, in which case, the bi-phase material 112 can be cooled and solidified by reversing the current and operating the Peltier junction as a cooler. In this example embodiment, the valve apparatus 100 includes a pump mechanism (not shown in this FIGURE) for pumping the bi-phase material 112 into or out of the junction 110.

Figure 2:
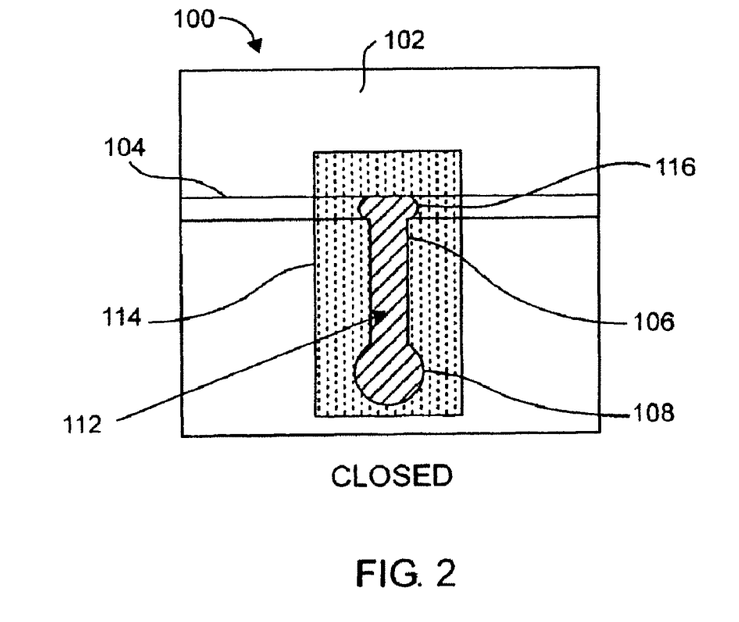

When the valve apparatus 100 is in its open state, the bi-phase material 112 is solid, and does not block the main flow channel 104. In order to close the valve apparatus 100, the entire region occupied by the bi-phase material 112, as well as the junction 110, is heated to a temperature above the melting point of the bi-phase material 112. After changing phase into a "control fluid", the bi-phase material 112 is then pumped toward the main flow channel 104 until the bi-phase material 112 completely fills the junction 110 between the two channels 104 and 106 and possibly some additional portion of the main flow channel 104. The heater 114 is then turned off and the bi-phase material 112 is allowed to solidify. Referring to FIG. 2, flow of a working fluid (not shown) through the valve apparatus 100 is blocked by a solid plug 116 of the bi-phase material 112, and the valve apparatus 100 is thus in a closed state. In either the open or closed state, the bi-phase material 112 is normally solid; it is heated to its melting point only for the purpose of switching the state of the valve apparatus 100. To reopen the valve apparatus 100, the heater 114 is again used to melt the bi-phase material 112. Once again as a "control fluid", the bi-phase material 112 is then pumped back into the reservoir 108, and again allowed to cool and solidify. The valve apparatus 100 is thus restored to the open configuration (FIG. 1). The valve apparatus 100 can be repeatedly cycled with the application of power, but no power is required to maintain the valve apparatus 100 in either the open or closed state. Provided no bi-phase material 112 is lost during cycling, there is no fundamental limit to the number of times the valve apparatus 100 can be cycled.

In various embodiments, valve apparatuses are configured in a manner suitable for Micro-Electro-Mechanical Systems (MEMS). By way of example, the main flow channel 104 and the control channel 106 are etched on glass, or molded into a plastic material. In an example embodiment, the main flow channel 104 and the control channel 106 have cross-sectional areas of approximately 10 micron. In various embodiments, the main flow channel 104 and the control channel 106 have cross-sectional dimensions of approximately 1 micron-1 mm, and the control channel 106 has a length of approximately 1-10 mm.

A number of methods for pumping the control fluid into and out of the junction can be used. For example, electromechanical, electroosmotic, and thermopneumatic pumping processes can be used; however, they add unnecessary complexity to the valve. Another possibility is to use a ferrofluid as the control fluid, pumping it with magnetic fields. Again, however, complexity is an issue.

Figure 3:
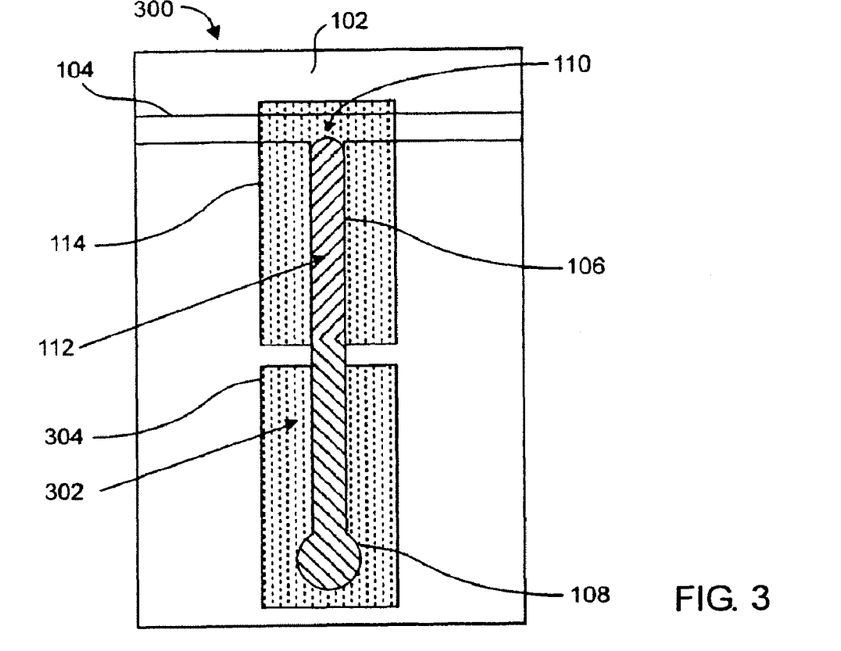
FIGS. 3 and 4 show an example embodiment of a valve apparatus, including a pumping mechanism with an expansion control fluid, in its open and closed configurations, respectively.
Figure 4:
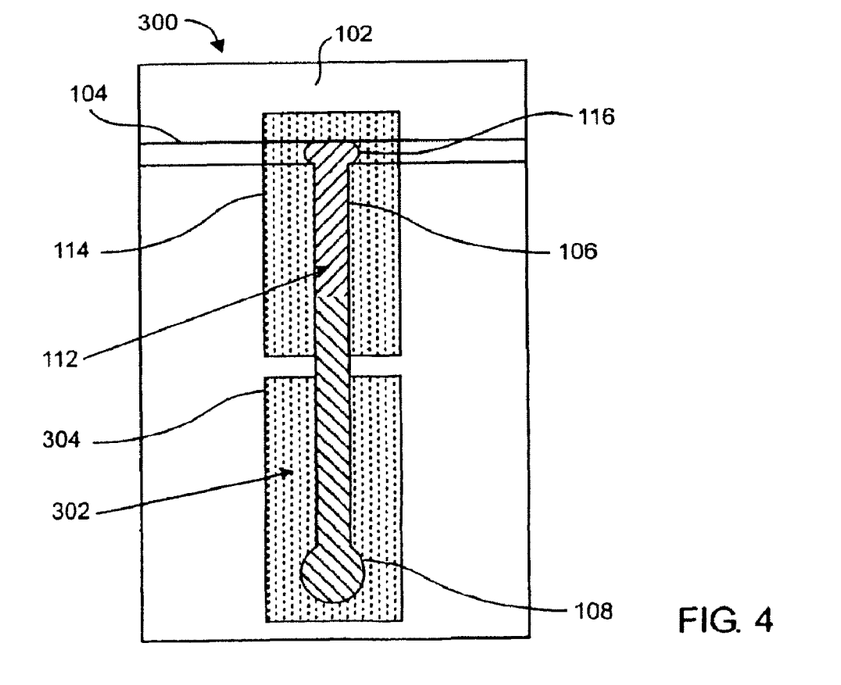

The complexity of these pumping techniques can be avoided by using expansion and contraction of a second control fluid to pump the first control fluid so that it will open and close the channel. Referring to FIG. 3, a valve apparatus 300 (similar to the valve apparatus 100) includes an expansion control fluid 302, with its own heating/cooling element 304. The expansion control fluid 302 is in contact with the bi-phase material 112 and undergoes expansion and contraction due to temperature changes brought about by the heating/cooling element 304. The expansion control fluid 302 is in contact with the bi-phase material 112 and alternately pushes or pulls the bi-phase material 112 as it expands or contracts, respectively. In FIG. 3, the valve apparatus 300 is shown in an open configuration. The valve apparatus 300 can be closed (as illustrated in FIG. 4) according to the following sequence of steps: the bi-phase material 112 is heated to melt into a phase-change control fluid; the expansion control fluid 302 is heated, causing it to expand and push the bi-phase material 112 into the main flow channel 104; the bi-phase material 112 is cooled and solidified; and heat is removed from the expansion control fluid 302. In the last step, the expansion control fluid 302 will tend to contract, but because the bi-phase material 112 is now solid, the expansion control fluid 302 will not cause the valve apparatus 300 to re-open.

Starting with the closed configuration shown in FIG. 4, the valve apparatus 300 can be opened according to the following sequence of steps: the bi-phase material 112 is heated to melting; the expansion control fluid 302 is cooled, causing it to contract and pull the bi-phase material 112 out of the main flow channel 104; the bi-phase material 112 is cooled and solidified; and the temperature of the expansion control fluid 302 is allowed to come to equilibrium. In the last step, the expansion control fluid 302 will tend to expand, but because the bi-phase material 112 is now solid, the expansion control fluid 302 will not cause the valve apparatus 300 to re-close. The valve apparatus 300 has now been restored to the open configuration shown in FIG. 3.

In an example embodiment, the expansion control fluid 302 is immiscible with the bi-phase material 112. By way of example, the bi-phase material 112 can be a paraffin wax, and the expansion control fluid 302 can be water. Near room temperature, water expands about 250 parts per million per degree Celsius. The temperature of the water could easily be changed by 20° C. during valve cycling, so it would be necessary to have a volume of water equal to no more than 200 times the required volume change. Other materials can be used for the expansion control fluid 302. For example, methanol and ethanol each have thermal expansion coefficients at room temperature that are about 6 times greater than that of water, so the volume of fluid required would be 6 times less to achieve the same volume change with the same temperature change. Alternatively, the large volume change that occurs with the freezing of water can be exploited. In this case, freezing causes an expansion of about 9 percent, so the pumping can be accomplished with a volume of expansion control fluid only 11 times greater than the required volume change.

Figure 5:
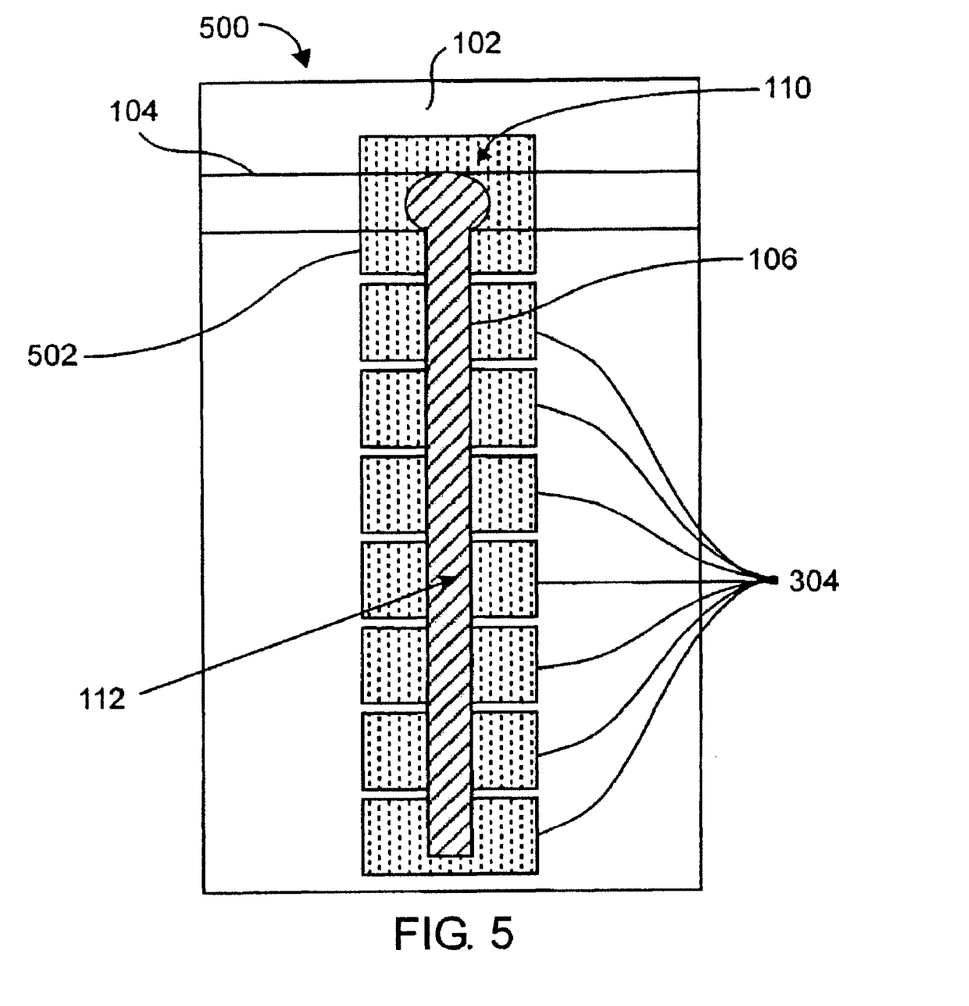
FIG. 5 shows an example embodiment of a valve apparatus, including a pump mechanism with multiple heating/cooling elements, in its closed configuration.
Figure 6A:
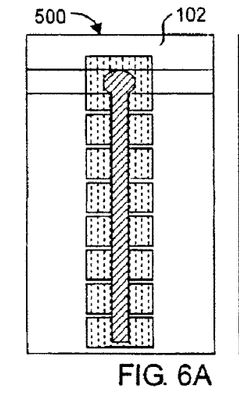
FIGS. 6A-6I show an example sequence of steps that can be used to open the valve apparatus of FIG. 5.
Figure 6B:
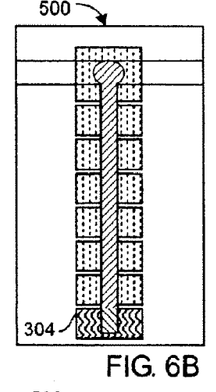
Figure 6C:
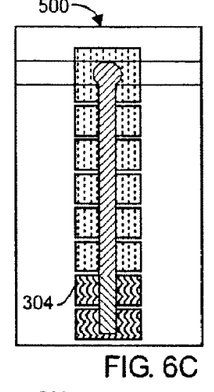
Figure 6D:
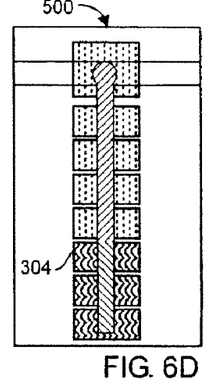
Figure 6E:
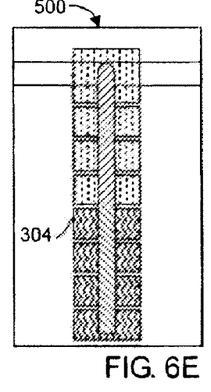
Figure 6F:
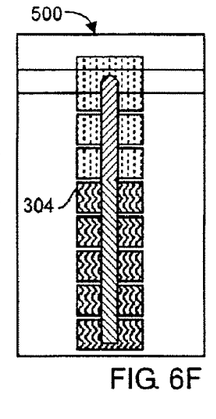
Figure 6G:
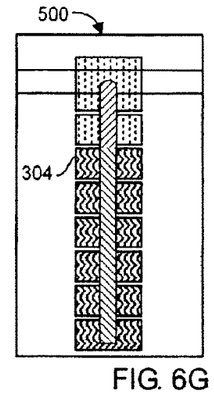
Figure 6H:
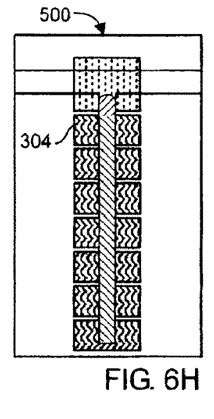
Figure 6I:
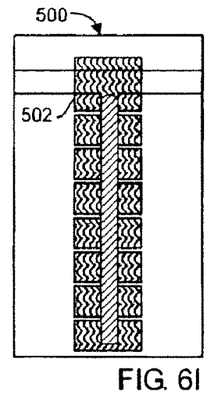

Referring to FIG. 5, in another example embodiment, a valve apparatus 500 uses the same fluid to perform the functions of both the bi-phase material 112 and the expansion control fluid 302 as described with reference to the previous embodiment. In this example embodiment, the control channel 106 is closed as shown and filled with a sufficient amount of the bi-phase material 112 to completely fill the junction 110 between the main flow channel 104 and the control channel 106 when the bi-phase material 112 is in a liquid state. The valve apparatus 500 includes a plurality of heating/cooling elements 304 arrayed along the control channel 106, and an additional heating/cooling element 502 adjacent to the junction 110. In FIG. 5, all of the heating/cooling elements are hot, and the bi-phase material 112 is in a liquid state. Depending on the sequence in which the heating/cooling elements are turned off, the control fluid will solidify in a position either blocking or not blocking the main flow channel 104. This is illustrated in FIGS. 6A-6I and 7A-7D. In FIG. 6A, the valve apparatus 500 is in the same configuration as shown in FIG. 5. In FIG. 6B, the heating/cooling element 304 closest to the closed end of the control channel 106 is switched to cool and solidifies the bi-phase material 112 in that section of the control channel 106. With the notable exception of water, almost all fluids contract on freezing. A typical paraffin wax, for example, will contract about 2-3 percent on freezing. When the portion of the bi-phase material 112 at the extremity of the control channel 106 solidifies, it will contract, drawing some of the liquid back from the junction 110 between the two channels. In FIG. 6C, the next heating/cooling element 304 is switched to cool and solidifies the control fluid adjacent thereto. This draws a little more of the control fluid out of the junction 110 between the channels. Referring to FIGS. 6D-6G, by freezing the remainder of the control fluid in a stepwise fashion working from the closed end of the control channel 106 toward the junction 110, the control fluid in the junction 110 will be gradually be drawn out. In FIG. 6H, the control fluid has been completely drawn out of the junction 110, and only a small portion of it remains in a liquid phase. In FIG. 6I, the heating/cooling element 502 under the junction 110 is switched to cool the control fluid, and the last of the bi-phase material 112 that is liquid becomes solid. The valve apparatus 500 is now stable in the open position with no application of power. The valve apparatus 500 can be restored to the configuration of FIG. 5 simply by switching all the heating/cooling elements to melt the bi-phase material 112; upon melting, the bi-phase material 112 will again expand and fill the junction 110 between the channels.

Figure 7A:
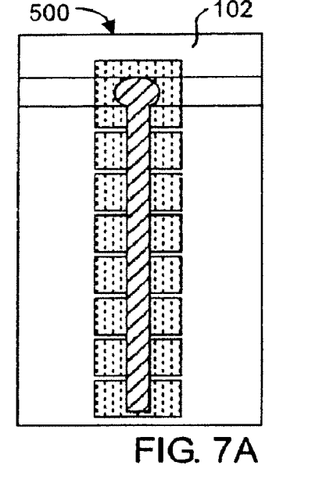
FIGS. 7A-7D show an example of alternate steps that can be used to close the valve apparatus of FIG. 5.
Figure 7B:
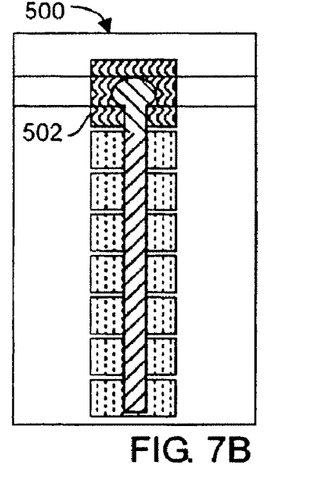
Figure 7C:
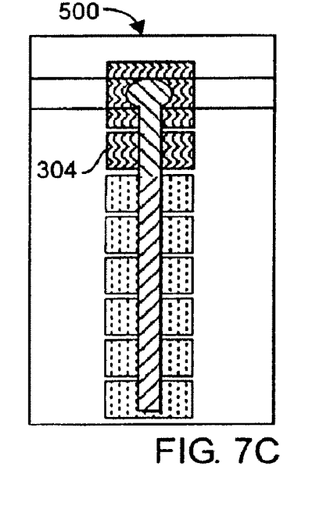
Figure 7D:
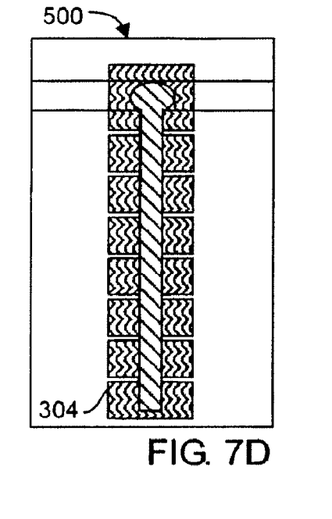

Referring to FIGS. 7A-7D, the heating/cooling elements are cycled in a different sequence. FIG. 7A shows the configuration of FIG. 5. In FIG. 7B, the heating/cooling element 502 under the junction 110 is switched to cool the control fluid. The fluid in the junction 110 solidifies in place, blocking the flow in the main flow channel 104. In FIG. 7C, the next heating/cooling element 304 out from the junction 110 is then switched to cool, solidifying another portion of the control fluid. The bi-phase material 112 in the junction 110 is already solid, so it does not move and the main flow channel 104 remains blocked. Instead, control fluid is drawn from the closed end of the control channel 106. Depending on the deformability of the channel walls, it may be advantageous to include a small spring-loaded diaphragm near the closed end of the control channel 106 to accommodate the contraction of the control fluid. The other heating/cooling elements 304 are then switched in succession, working outward from the junction 110 toward the closed end of the control channel 106 until the configuration shown in FIG. 7D is reached. Here the valve apparatus 500 is stable in the closed position with no application of power. The valve apparatus 500 can be restored to the configuration of FIG. 5 simply by switching all the heating/cooling elements to melt the control fluid; upon melting, the bi-phase material 112 will again expand and fill the junction 110 between the channels.

Thus, in an example embodiment, a valve apparatus includes a substrate, a main flow channel formed in the substrate, a control channel formed in the substrate such that the main flow channel and the control channel meet at a junction, a bi-phase material within the control channel, a heating element adjacent the control channel and the junction, the heating element being controllable to generate sufficient energy to cause the bi-phase material to transition from a solid phase to a liquid phase, and a pumping mechanism for selectively forcing the bi-phase material either into or out of the junction when the bi-phase material is in the liquid phase, thereby providing a bi-stable, phase-change valve.

In another example embodiment, a valve apparatus includes a substrate, a main flow channel formed in the substrate, a control channel formed in the substrate such that the main flow channel and the control channel meet at a junction, a bi-phase material within the control channel, an expansion control fluid adjacent the bi-phase material, a first temperature control element adjacent the control channel and the junction, the first temperature control element being controllable over a temperature range including a melting temperature of the bi-phase material, and a second temperature control element adjacent the control channel, the second temperature control element being controllable to either expand or contract the expansion control fluid when the bi-phase material is in a liquid phase to pump the bi-phase material into or out of the junction, thereby providing a bi-stable, phase-change valve.

In another example embodiment, a-valve apparatus includes a substrate, a main flow channel formed in the substrate, a control channel formed in the substrate such that the main flow channel and the control channel meet at a junction, a bi-phase material within the control channel, a first temperature control element adjacent the control channel and the junction, and one or more additional temperature control elements positioned in an array along the control channel further away from the junction than the first temperature control element. The first temperature control element and the one or more additional temperature control elements are each selectively controllable over a temperature range including a melting temperature of the bi-phase material to pump the bi-phase material, when the bi-phase material is in a liquid phase, into or out of the junction, thereby providing a bi-stable, phase-change valve.

Figure 8:
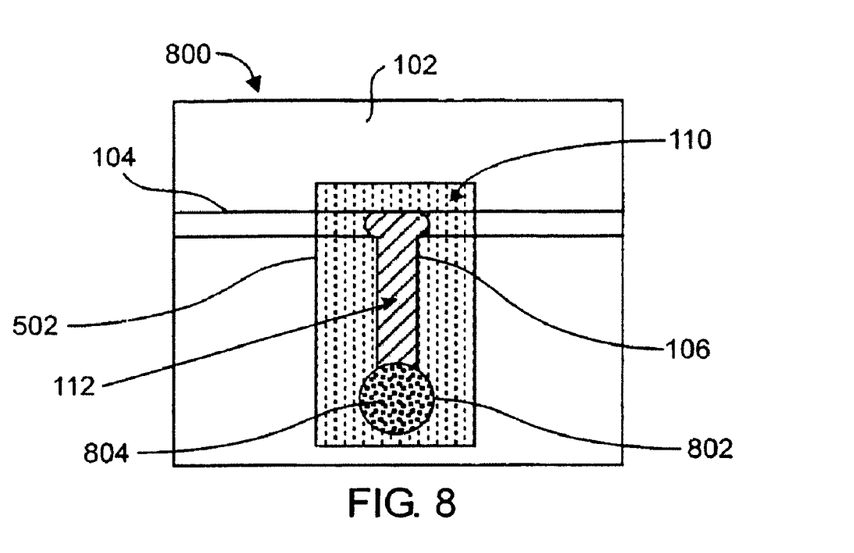
FIGS. 8 and 9 show an example embodiment of a valve apparatus, including a pumping mechanism with a wick material, in its closed and open configurations, respectively.
Figure 9:
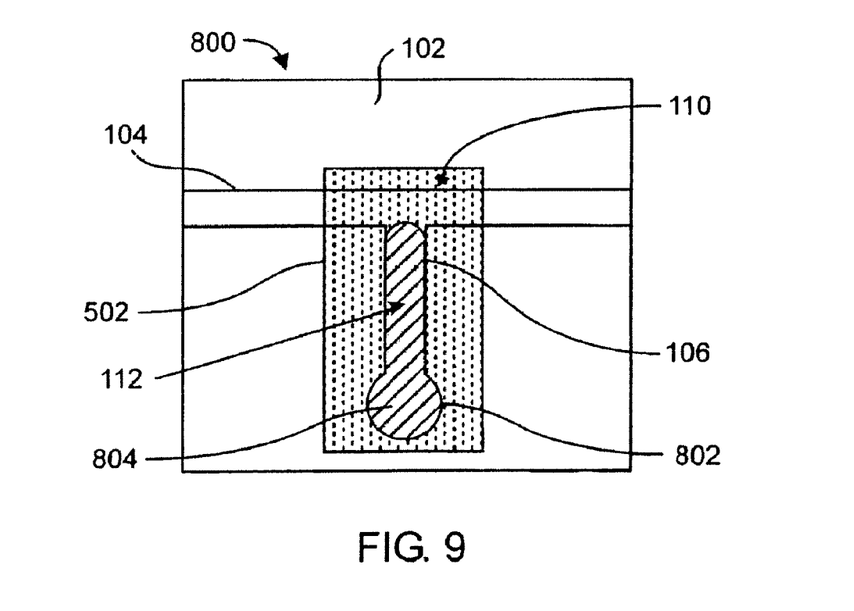

In various embodiments, valve apparatuses are configured such that they remain closed until actuated, and then switch to an open position and remain there. By way of example, such "single use" valve apparatuses can be used to seal fluids into a closed volume (e.g., storage of fluids on a microfluidic device) for long periods of time. Referring to FIG. 8, in an example embodiment, a valve apparatus 800 (similar to the valve apparatus 100) includes an end volume 802 filled with a porous material 804 (e.g., a wick) that is easily wetted by bi-phase material 112 in the liquid phase. In this valve, the bi-phase material 112 is initially provided in a solidified form that blocks the junction 110 between the main flow channel 104 and the control channel 106. The bi-phase material 112, in its initial solid phase, also fills the control channel 106 except for the end volume 802. The valve apparatus 800 is actuated by heating the bi-phase material 112. When the bi-phase material 112 is liquefied, it is pulled by wicking action into the end volume 802 at the end of the control channel 106, and thereby drawn out of the main flow channel 104. The heating/cooling element 502 is then switched to cool the control fluid, which then solidifies in the configuration shown in FIG. 9. The valve apparatus 800 is open in this configuration, and working fluid is free to pass through the main flow channel 104.

Thus, in an example embodiment, a valve apparatus includes a substrate, a main flow channel formed in the substrate, a control channel formed in the substrate such that the main flow channel and the control channel meet at a junction, a bi-phase material within the control channel, a heating element adjacent the control channel and the junction, the heating element being controllable to generate sufficient energy to cause the bi-phase material to transition from a solid phase to a liquid phase, and a mechanism for wicking the bi-phase material out of the junction when the bi-phase material is in the liquid phase, thereby providing a single-use, phase-change valve.

Figure 12:
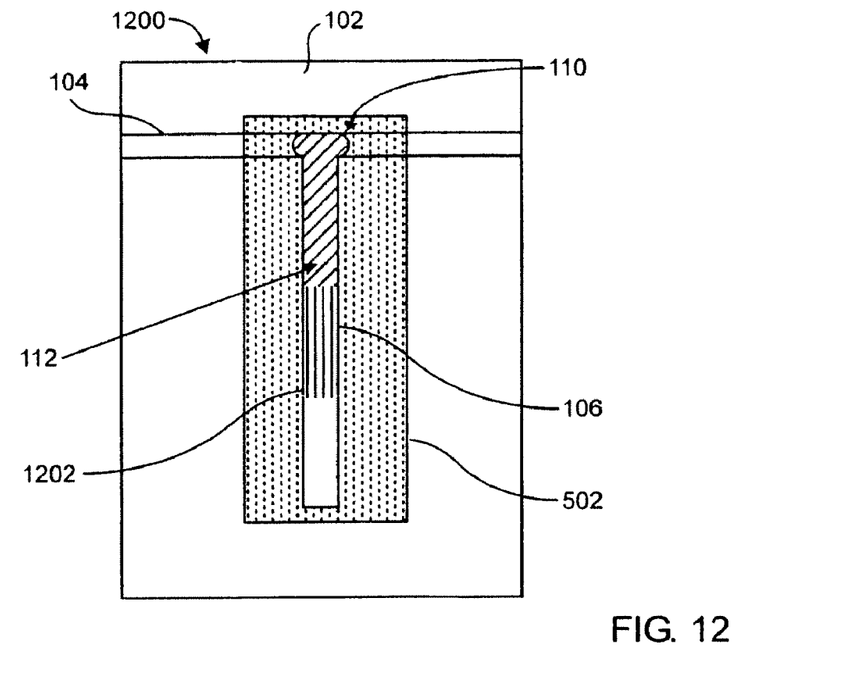
FIGS. 12 and 13 show an example embodiment of a valve apparatus, including a pumping mechanism with microchannels, in its closed and open configurations, respectively.
Figure 13:
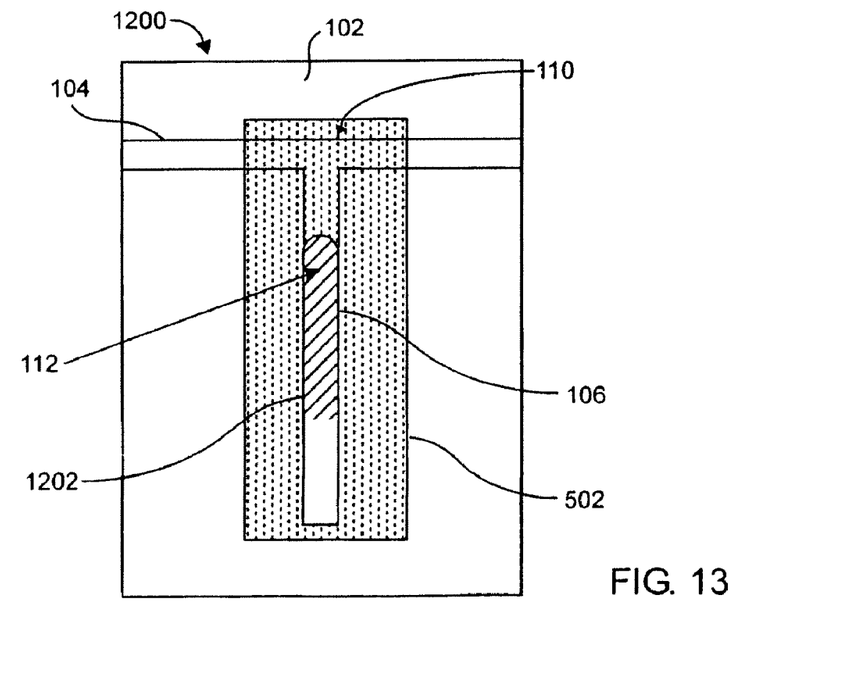

In a variation on this valve, the porous material is replaced by a plurality of microchannels significantly smaller than the control channel. By way of example, and referring to FIG. 12, a valve apparatus 1200 (similar to the valve apparatus 100) includes a plurality of microchannels 1202 positioned within the control channel 106. The microchannels are initially empty of the bi-phase material 112. When the valve apparatus 1200 is heated to melt the bi-phase material 112, the resulting control fluid flows into the microchannels 1202 by capillary action, drawing the control fluid out of the main flow channel 104. The heating/cooling element 502 is then turned off, leaving the valve apparatus 1200 in the open configuration shown in FIG. 13.

Thus, in an example embodiment, a valve apparatus includes a substrate, a main flow channel formed in the substrate, a control channel formed in the substrate such that the main flow channel and the control channel meet at a junction, a bi-phase material within the control channel, a heating element adjacent to the control channel and the junction, the heating element being controllable to generate sufficient energy to cause the bi-phase material to transition from a solid phase to a liquid phase, and a capillary action mechanism for drawing the bi-phase material out of the junction when the bi-phase material is in the liquid phase, thereby providing a single-use, phase-change valve.

Figure 14A:
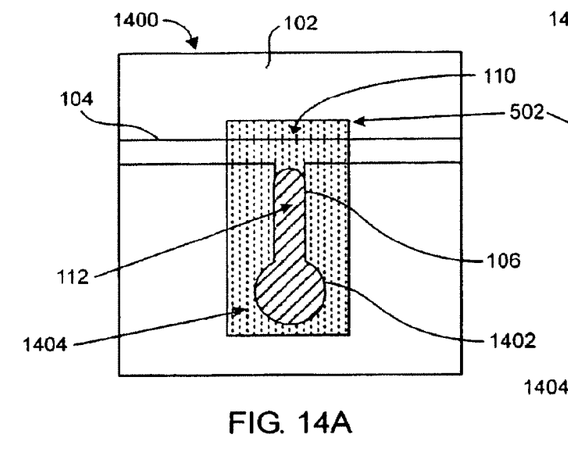
FIGS. 14A and 14B show an example embodiment of a valve apparatus, including a pumping mechanism with a flexible diaphragm, in its open configuration.
Figure 14B:
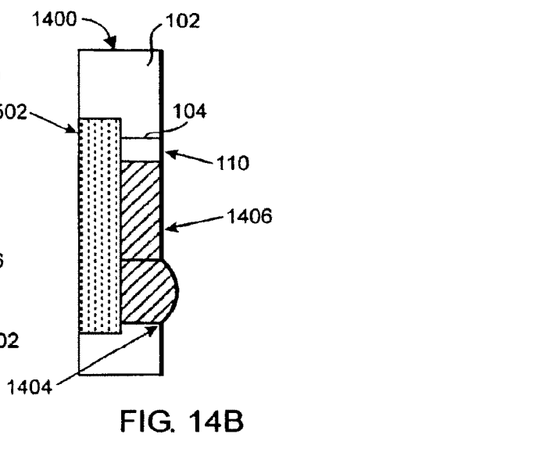
Figure 15A:
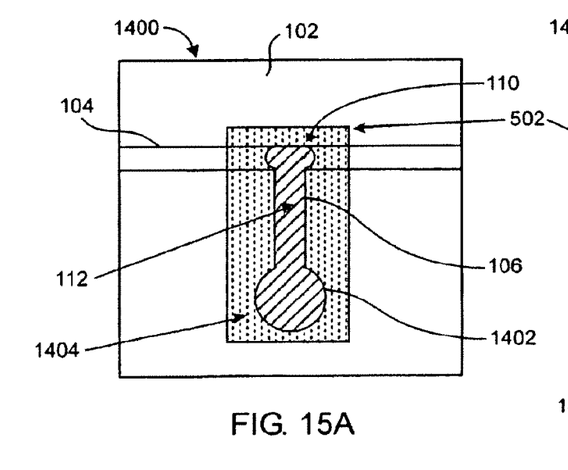
FIGS. 15A and 15B show the valve apparatus of FIGS. 14A and 14B in its closed configuration.
Figure 15B:
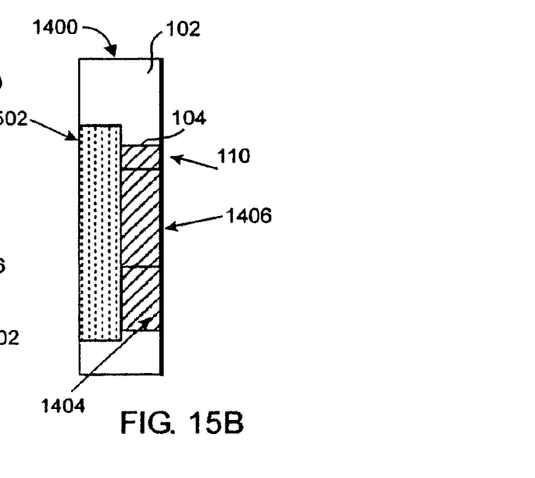

In various embodiments, a single-use bi-stable valve apparatus is initially open. In such embodiments, application of power causes the valve apparatus to close, and it remains closed after the power is turned off. By way of example, and referring to FIGS. 14A and 14B, a valve apparatus 1400 includes a control volume 1402, at least one side of which is closed by a flexible diaphragm 1404 (e.g., a spring-loaded metal diaphragm), and a cover layer 1406. The control channel 106 leads to the control volume 1402 which are both filled with the bi-phase material 112. However, the junction 110 is not filled, and working fluid is free to flow through the valve apparatus 1400. More specifically, the control volume 1402 is filled to the point where the flexible diaphragm 1404 is pushed outward (FIG. 14B), under stress, resulting in the control volume 1402 being larger than it would be in a relaxed state. Because the bi-phase material 112 is solid, the flexible diaphragm 1404 is unable to move toward its relaxed state and stays in the pushed outward position. The valve apparatus 1400 is actuated by heating the control volume 1402, the control channel 106, and the junction 110 to a temperature above the melting point of the bi-phase material 112. The diaphragm 1404 then relaxes, decreasing the size of the control volume 1402, and causing the fluid to flow into the junction 110. The heating/cooling element 502 is then switched to cool causing the control fluid to solidify. The valve apparatus 1400 is now stable in the closed position, as shown in FIGS. 15A and 15B, with no further requirement for application of power.

Thus, in an example embodiment, a valve apparatus includes a substrate, a main flow channel formed in the substrate, a control channel formed in the substrate such that the main flow channel and the control channel meet at a junction, a bi-phase material within the control channel, a heating element adjacent to the control channel and the junction, the heating element being controllable to generate sufficient energy to cause the bi-phase material to transition from a solid phase to a liquid phase, and a flexible diaphragm adjacent to the bi-phase material, the flexible diaphragm being biased to push the bi-phase material into the junction when the bi-phase material is in the liquid phase, thereby providing a single-use, phase-change valve.

Figure 16A:
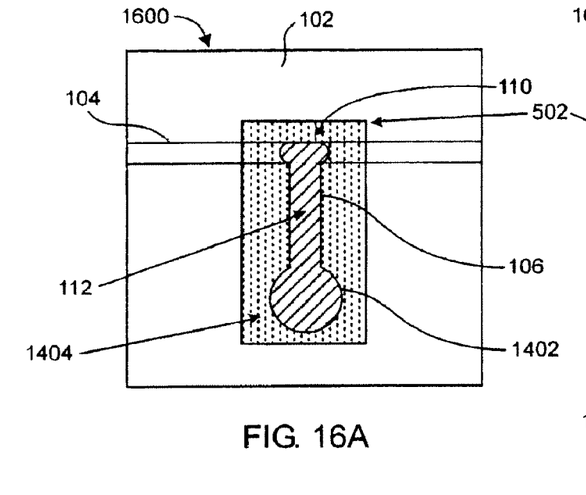
FIGS. 16A and 16B show an example embodiment of a valve apparatus, including a pumping mechanism with a flexible diaphragm, in its closed configuration.
Figure 16B:
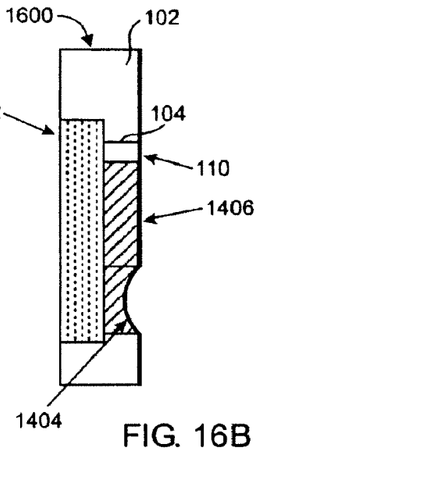
Figure 17A:
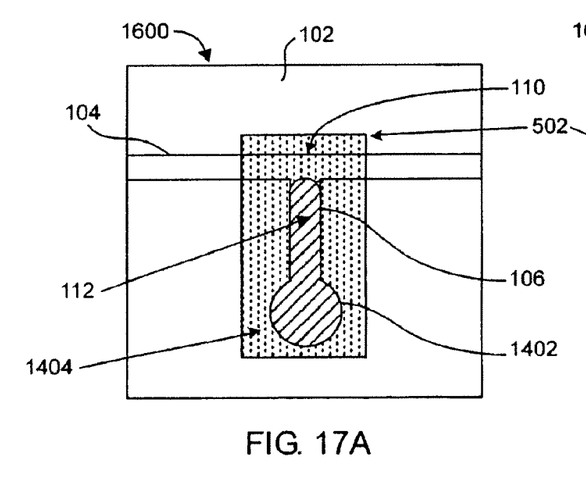
FIGS. 17A and 17B show the valve apparatus of FIGS. 16A and 16B in its open configuration.
Figure 17B:
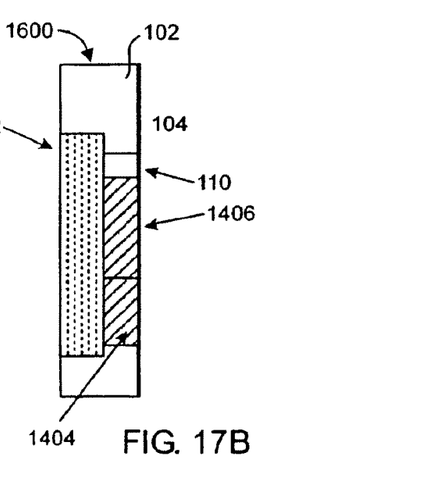

A similar pumping methodology can be applied to making a single-use bi-stable valve apparatus this is initially closed. By way of example, and referring to FIGS. 16A and 16B, a valve apparatus 1600 (similar to the valve apparatus 1400) includes a control volume 1402, at least one side of which is closed by a flexible diaphragm 1404 (e.g. a spring-loaded metal diaphragm), and a cover layer 1406. In this example embodiment, the bi-phase material 112 initially fills the control volume 1402, the control channel 106, and the junction 110 such that flow of working fluid through the main flow channel 104 is blocked. In this example embodiment, the control volume 1402 is under filled, with the diaphragm being deflected inward against a spring load. When power is applied to heat and melt the bi-phase material 112, the diaphragm 1404 relaxes, causing the control volume 1402 to increase, and pulling the control fluid out of the main flow channel 104. Power is then switched to cool and solidify the control fluid, leaving the valve apparatus 1600 in the configuration shown in FIGS. 17A and 17B, where the working fluid is free to flow.

Thus, in an example embodiment, a valve apparatus includes a substrate, a main flow channel formed in the substrate, a control channel formed in the substrate such that the main flow channel and the control channel meet at a junction, a bi-phase material within the control channel, a heating element adjacent to the control channel and the junction, the heating element being controllable to generate sufficient energy to cause the bi-phase material to transition from a solid phase to a liquid phase, and a flexible diaphragm adjacent to the bi-phase material, the flexible diaphragm being biased to pull the bi-phase material out of the junction when the bi-phase material is in the liquid phase, thereby providing a single-use, phase-change valve.

Figure 10:
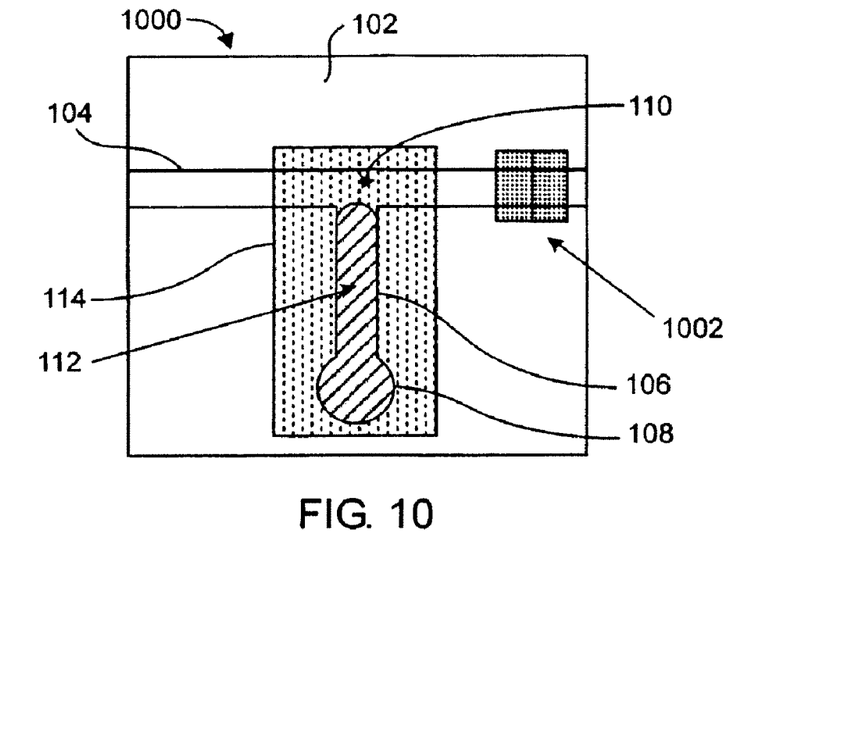
FIGS. 10 and 11 show an example embodiment of a valve apparatus, with a Peltier-actuated valve in series with a bi-stable valve, in its open and closed configurations, respectively.
Figure 11:
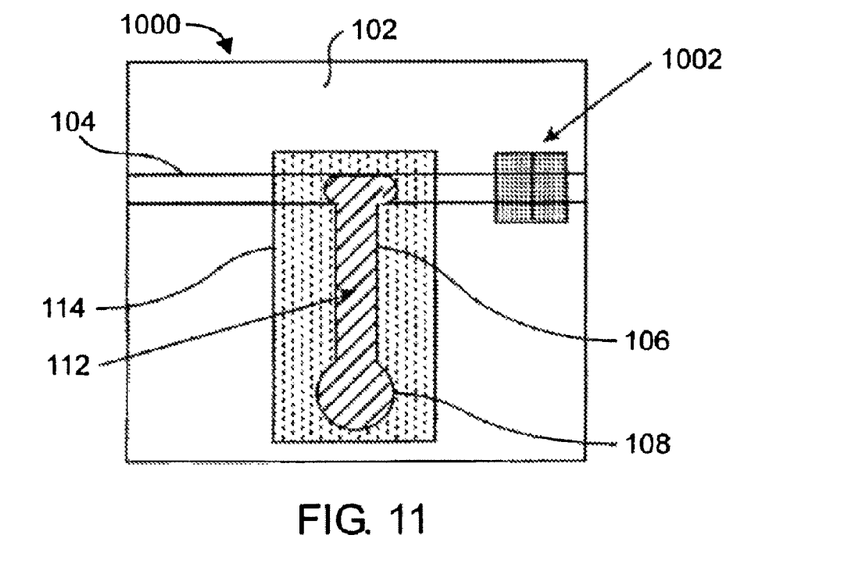

In each of the previously described embodiments, valve switching involves changing the bi-phase material 112 to the liquid phase, which potentially could get washed downstream in the main flow channel 104. This can be a problem if there are places downstream in the system where particles of solid bi-phase material 112 might block small flow channels, or might interfere with a chemical or biological process or analysis. Loss of control fluid is likely if there is any flow through the valve while it is being cycled. In various embodiments, this potential problem is addressed by providing the valve apparatus with a second valve, of another type, in series with the bi-stable valve. This makes it possible to ensure that there is no pressure drop and no flow in the bi-stable valve when it is being cycled. By way of example, and referring to FIG. 10, a valve apparatus 1000 (similar to the valve apparatus 100) includes a Peltier-actuated valve 1002 in series with the bi-stable valve. In this FIGURE, the bi-stable valve is in the open configuration. To close the bi-stable valve, power is first applied to close the Peltier-actuated valve 1002. This stops all flow in the system. The bi-stable valve is then cycled as describe above. After the control fluid has solidified, the Peltier-actuated valve 1002 can be turned off. This reconfigures the valve apparatus 1000 to the closed configuration shown in FIG. 11. The valve apparatus 1000 is stable in the closed position with no power being applied. To reopen the valve apparatus 1000, power is again applied first to close the Peltier-actuated valve 1002. This ensures that there is no pressure drop across the bi-stable valve. The bi-stable valve is then cycled as described above, without concern that there will be a sudden rush of the working fluid that might wash some of the control fluid downstream. After the bi-stable valve has completed cycling and the control fluid is solidified, the Peltier-actuated valve 1002 can be turned off, allowing the fluid to flow. The Peltier-actuated valve 1002 can be combined with any bi-stable valve including but not limited to the embodiments described above.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A valve apparatus comprising:
   a substrate;
   a main flow channel formed in the substrate;
   a control channel formed in the substrate such that the main flow channel and the control channel intersect to define a junction;
   a bi-phase material disposed within the control channel;
   a heating element adjacent to the control channel and the junction, the heating element being controllable to generate sufficient energy to cause the bi-phase material to transition from a solid phase to a liquid phase; and
   means for pulling the bi-phase material out of the junction when the bi-phase material is in the liquid phase, wherein the means for pulling the bi-phase material comprises capillary action means for drawing the bi-phase material out of the junction, wherein the capillary action means includes:
   a reservoir adjacent to the control channel; and
   a plurality of microchannels within the reservoir.

2. The valve apparatus of claim 1, wherein the bi-phase material comprises a paraffin wax.

3. The valve apparatus of claim 1, wherein the heating element comprises a resistance heater.

4. The valve apparatus of claim 1, wherein the heating element comprises a Peltier junction.

5. The valve apparatus of claim 1, wherein the substrate comprises glass or plastic.

6. The valve apparatus of claim 1, wherein the main flow channel and the control channel each have a cross sectional dimensions of 1 micron to one millimeter.

7. The valve apparatus of claim 1, wherein the valve apparatus is for single use only.

* * * * *